US006948635B2

(12) United States Patent
Kobayashi

(10) Patent No.: US 6,948,635 B2
(45) Date of Patent: Sep. 27, 2005

(54) MEDICINE CASE AND MEDICINE PACKING APPARATUS PROVIDED WITH THIS MEDICINE CASE

(75) Inventor: Koichi Kobayashi, Osaka-fu (JP)

(73) Assignees: Sanyo Electric Co., Ltd., Osaka-fu (JP); Sanyo Electric Biomedical Co., Ltd., Osaka-fu (JP)

( * ) Notice: Subject to any disclaimer, the term of this patent is extended or adjusted under 35 U.S.C. 154(b) by 306 days.

(21) Appl. No.: 10/455,565

(22) Filed: Jun. 5, 2003

(65) Prior Publication Data

US 2003/0226852 A1 Dec. 11, 2003

(30) Foreign Application Priority Data

Jun. 6, 2002 (JP) ....................................... 2002-165119

(51) Int. Cl.[7] .......................... B65G 59/00; B65H 3/00; G07F 11/16; G07F 11/24

(52) U.S. Cl. ...................................................... 221/264

(58) Field of Search ................................. 221/264, 277

(56) References Cited

U.S. PATENT DOCUMENTS 5,865,342 A * 2/1999 Ito et al. ..................... 221/265

FOREIGN PATENT DOCUMENTS

| | | | | |
|---|---|---|---|---|
| JP | 57-7660 | | 2/1982 | |
| JP | 09 095312 | | 4/1997 | |
| JP | 2000-219315 | * | 8/2000 | ........... B65G/47/14 |
| JP | 2002-291845 | * | 10/2002 | ............. A61J/3/00 |

* cited by examiner

*Primary Examiner*—Donald P. Walsh
*Assistant Examiner*—Kenneth W. Bower
(74) *Attorney, Agent, or Firm*—Weingarten, Schurgin, Gagnebin & Lebovici LLP

(57) ABSTRACT

The present invention intends to let the medicine fall regularly, by eliminating the static electricity charged on the medicine in the medicine case. A medicine case comprising a medicine case portion for containing medicine in the upper part and a mechanism unit in the lower part, the mechanism unit having a inflow passage where inflows medicine in the medicine case section and a guide face for guiding medicine into this inflow passage, an alignment body rotated or shaken by a driving unit and a fixing plate having a partition interposed in the way between a medicine chute passage communicating with the inflow passage and the inflow passage, wherein a self-dischargeable cloth having an area opposed at least to the slide area due to the shake, or, rotation of the alignment body is arranged, outside this medicine case, prevents this alignment body, the medicine and the portion of the medicine case section susceptible to be charged by mutual rubbing from being charged, and in case they are charged, they discharge and, therefore a failed discharge where the medicine is not discharged can be prevented as far as possible.

5 Claims, 5 Drawing Sheets

MEDICINE CASE AND MEDICINE PACKING APPARATUS PROVIDED WITH THIS MEDICINE CASE

BACKGROUND OF THE INVENTION

1. Field of the Invention

The present invention concerns a medicine packing apparatus, in a hospital or other institutions, for filling a container (bottle, bag and so on) with medicines contained in the container (hereinafter, the medicine shall include all preparations in solidified form such as tablets, capsules, pills, troches) by a quantity indicated on a prescription.

2. Detailed Description of the Prior Art

Conventionally, in the hospital or preparation pharmacy, tablets prescribed by a doctor are dispensed to the patient, using a medicine dispenser described in Utility Model Publication No. 1982-7660 (B65D83/04), for instance. Such a method consisted in discharging tablets (medicine) of the quantity described in the prescription one by one from a discharge drum (called alignment table in the Publication) in a tablet case (medicine case). Then the tablets are collected by means of hopper or convener or the like and packed.

In this case, a plurality of ditches (alignment holes) are formed up and down on the side face of the discharge drum in the tablet case and, medicines that are solidified preparations such as tablets, capsules, pills, troches enter in these respective ditches in a line vertically. Then, if the discharge drum is rotated in this state, the medicine falls from a ditch mating with the outlet (chute hole) and, at the same time, fallen medicines were counted one by one by a discharge count means disposed in the vicinity of the outlet.

By the way, these tablet case, discharge drum and others are ordinary molded with synthetic resin in consideration of not only security and hygiene, but also complexity of manufacturing, prevention of medicines' damage and so on. In addition, as many medicines are encapsulated, static electricity has been generated and charged on the medicine due to friction between the rotating discharge drum and the medicine, or friction between medicines each other, or friction between the tablet case and medicines, when the discharge drum is rotated.

Thus, when the electrostatic charge is generated on medicines in a tablet case, since the medicines are very light, they are absorbed to the inner face of the tablet case or the discharge drum and do not fall even if the discharge drum is rotated.

As an invention to reduce the electrostatic charge, the one disclosed in Laid-Open Japanese Patent Publication No. 1997-95312 is known. The invention has certain effect of reducing the electrostatic charge, but it cannot completely eliminate the electrostatic charge and, therefore, it is not satisfactory.

The present invention has been devised in order to solve such technical problems of the prior art and provides a medicine packing apparatus that can let a medicine fall smoothly, by eliminating the static electricity charged on medicines in a medicine case.

SUMMARY OF THE INVENTION

The medicine packing apparatus of the present invention is a medicine case comprising a medicine case portion for containing medicine in the upper part and a mechanism unit in the lower part, the mechanism unit having an inflow passage where inflows medicine in the medicine case portion and a guide face for guiding medicine into this inflow passage, an alignment body rotated or shaken by a driving unit and a fixing plate having a partition interposed in the way between a medicine chute passage communicating with the inflow passage and the inflow passage, wherein a self-dischargeable cloth having an area opposed at least to the slide area of the alignment body is arranged, outside this medicine case.

Moreover, a medicine case, wherein a self-dischargeable cloth having a breadth of at least 20 mm in the upper part of the inflow passage, or, at least five tablets of the medicine is arranged all around the outside of the medicine case.

In addition, a medicine case, in which a self-dischargeable cloth having an area opposing at least to the slide area of the alignment body, and having a breadth of at least 20 mm in the upper part of the inflow passage or at least five tablets of the medicine is arranged, outside this medicine case.

Further, the one wherein the self-dischargeable cloth is pasted to the medicine case with an electro conductive two-sided tape from outside.

Moreover, a medicine packing apparatus, comprising the medicine case of any of those described above.

DESCRIPTION OF SYMBOLS

Figure 1:
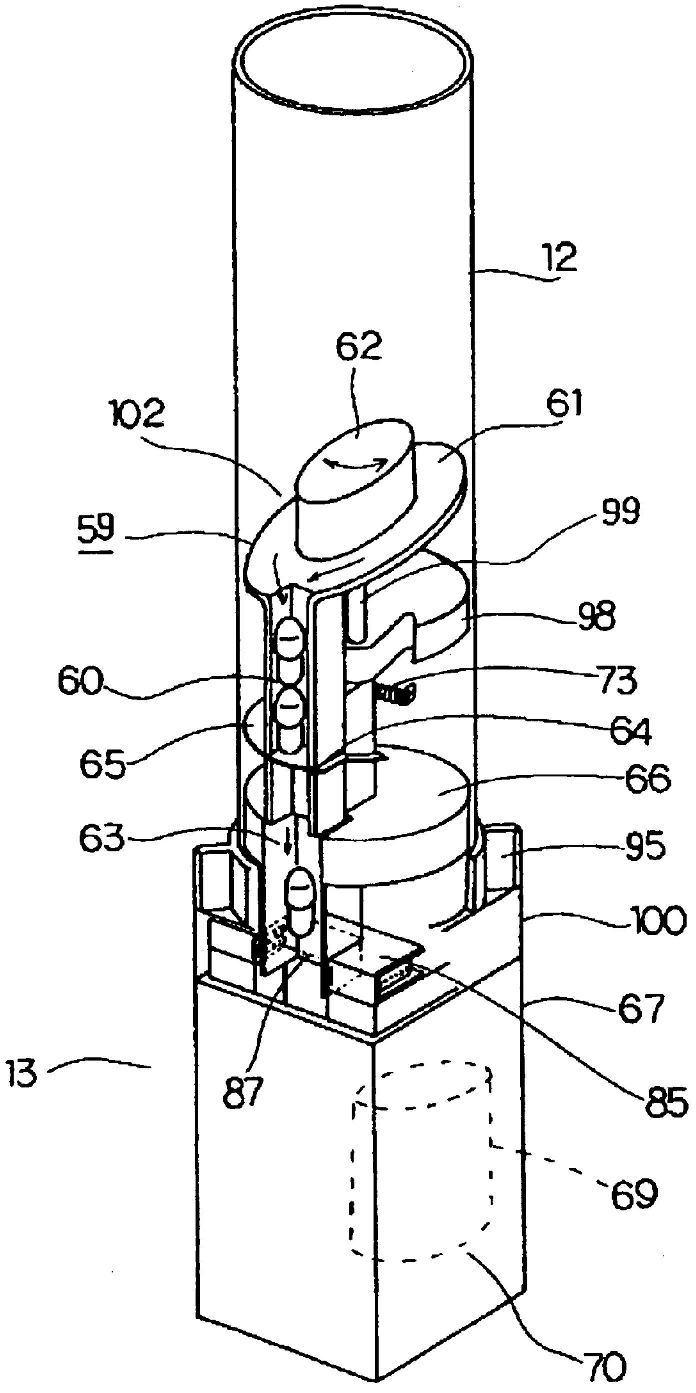
FIG. 1 is a perspective view of a medicine case at the interposed position of the partition of the alignment body.

1 Medicine packing machine (medicine packing apparatus)

6 Medicine case

12 Medicine case portion

13 Mechanism unit

59 Alignment body

60 Ditch (inflow passage, chute passage)

61 Guide face

62 Alignment member

63 Notch

64 Slit

65 Partition

66 Fixing plate

70 Driving unit

Ad, Ea, Ac Self-discharge cloth (self-dischargeable cloth)

DETAILED DESCRIPTION OF THE PREFERRED EMBODIMENT

Now, an embodiment of the present invention shall be described based on the drawing.

1 is a tablet packing machine (medicine packing apparatus) for tablets among medicines. This packing machine comprises a casing having a medicine containing portion 2 on the upper part thereof and a packing machine portion 3 on the lower part thereof, a plurality of medicine cases arranged flatly by inserting into a lattice-like partition 5 of the medicine containing portion 2, and formed in a vertically elongated form, a dispensing mechanism 7 for taking out a predetermined number of tablets from the lower part of those selected from these medicine cases and batch dispensing into a packing bag, and a control unit 8 for controlling the tablet pick-up operation of the medicine case and the tablet dispensing operation or others of the dispensing mechanism, for seal-package the packing bag where tablets are dispensed.

A sliding door 9 is mounted to the top face of the casing 4, and the top face opens by sliding the door, to expose the lattice-like partition 5 and the upper part of the medicine case 6 arranged between the partitions. The partitions are disposed in 12 rows in the depth direction, and composed as a module by 10 lines per unit. (, where these rows and lines are not limited to this) Consequently, 1 module corresponding to 120 tablets can contain 120 kinds of tablets, namely, 120 medicine cases 6, and a composition for containing 120, 240, 360, 480 kinds and so on can be realized by linking a plurality of the modules. A step-like bottom plate 10 depressed in the center is disposed under the lattice-like partition 5, and an electric connector 11 is mounted to a portion of the bottom plate where the medicine case 6 contacts.

There, the medicine case 6 is electrically connected with the control unit 8 by inserting into the electric connector 11, for receiving and delivering driving signal or detection signal.

Figure 4:
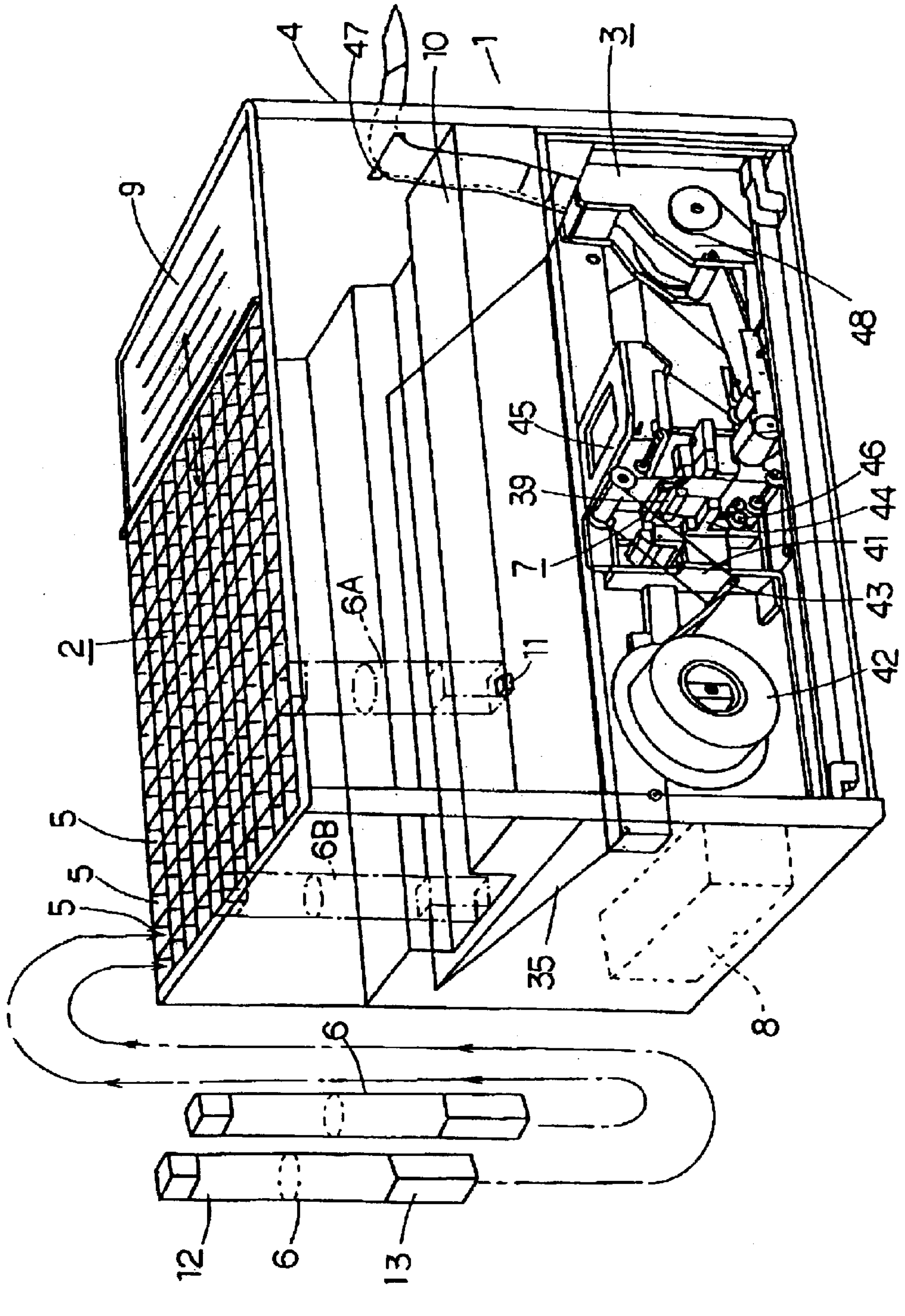
FIG. 4 is a perspective view of a tablet packing machine.
Figure 5:
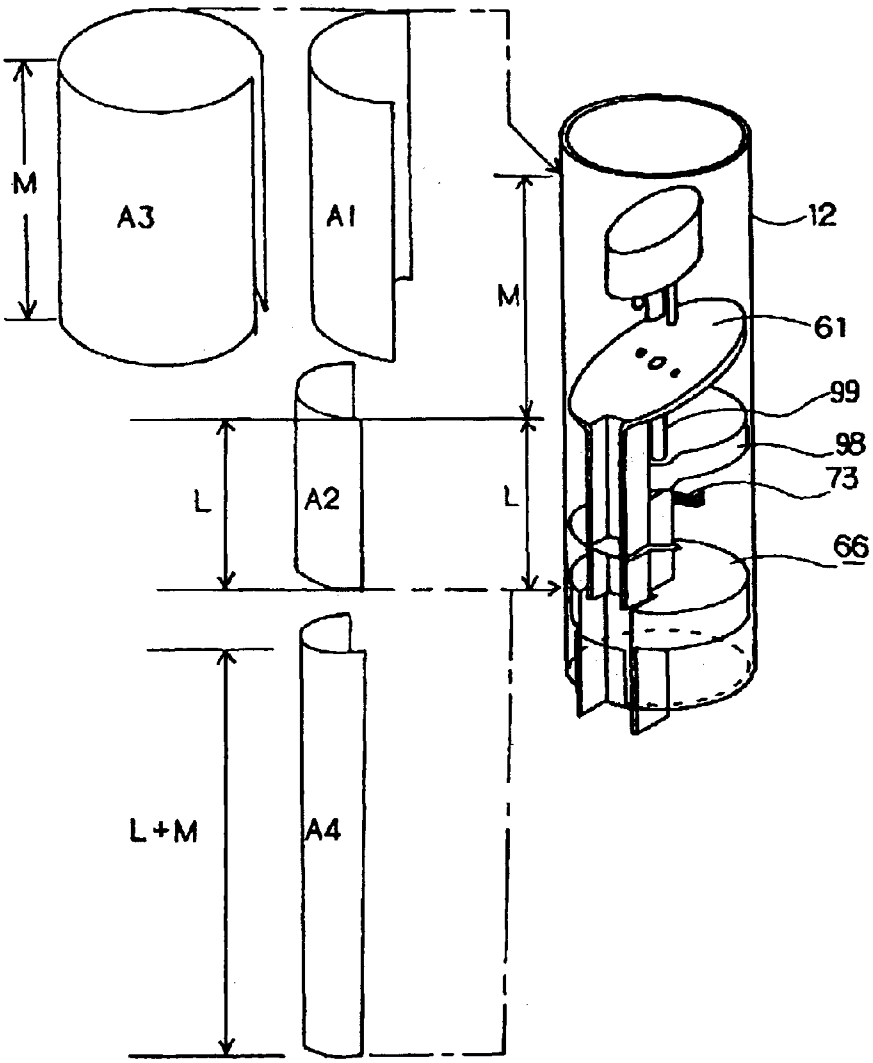
FIG. 5 is an illustrative drawing showing the comparative test of the present invention.

It should be noted that, as the bottom plate 10 is formed into a step shape, it can contain two kinds of medicine case 6A and 6B, different in length as shown by chained line in FIG. 4, and it is so made to be able to contain an appropriate number of tablet even when the size of tablet is different.

The medicine case 6 is formed into a vertically elongated pillar shape (300 mm in length) as mentioned above, a cylindrical (ø 46 mm) transparent medicine case portion 12 for containing tablets is formed on the upper part and a square pillar shape mechanism unit 13 is formed detachable on the lower part.

The mechanism unit 13 is comprised of an alignment body 59 having a guide face 61 inclined with a downward slope toward a ditch {60} (inflow passage, chute passage) for vertically aligning a plurality of tablets in one place on the side part and an alignment member 62 protruding circularly on the guide face 61 in a way to define an tablet passage around the outer circumference, bearing body 98 having a semicircular plate shape mounted to the case so as to bear a driving shaft 99 of this alignment body, a disk shape fixing plate 66 having a notch 63 for dropping tablets in a portion of the outer periphery in which a partition 65 interposing in a slit 64 formed in the middle of the ditch 60 is fitted, a support base 67 having a square pillar shape, a linkage frame 100 for linking this support base and the medicine case portion 12, an shake mechanism 68 for shaking the alignment body 59 between a position where the partition 65 interposes in the ditch 60 (position shown in FIG. 1) and a position where it does not interpose (position shown in FIG. 2) taking the driving shaft 99 installed at the center of the alignment body as a fulcrum, and a driving unit 70 comprising a gear reducer (not shown) built in the support base 67 in order to drive this shake mechanism 68 and a DC motor 69. It should be noted that the shake angle of the alignment body 59 is about 90 degrees.

Figure 2:
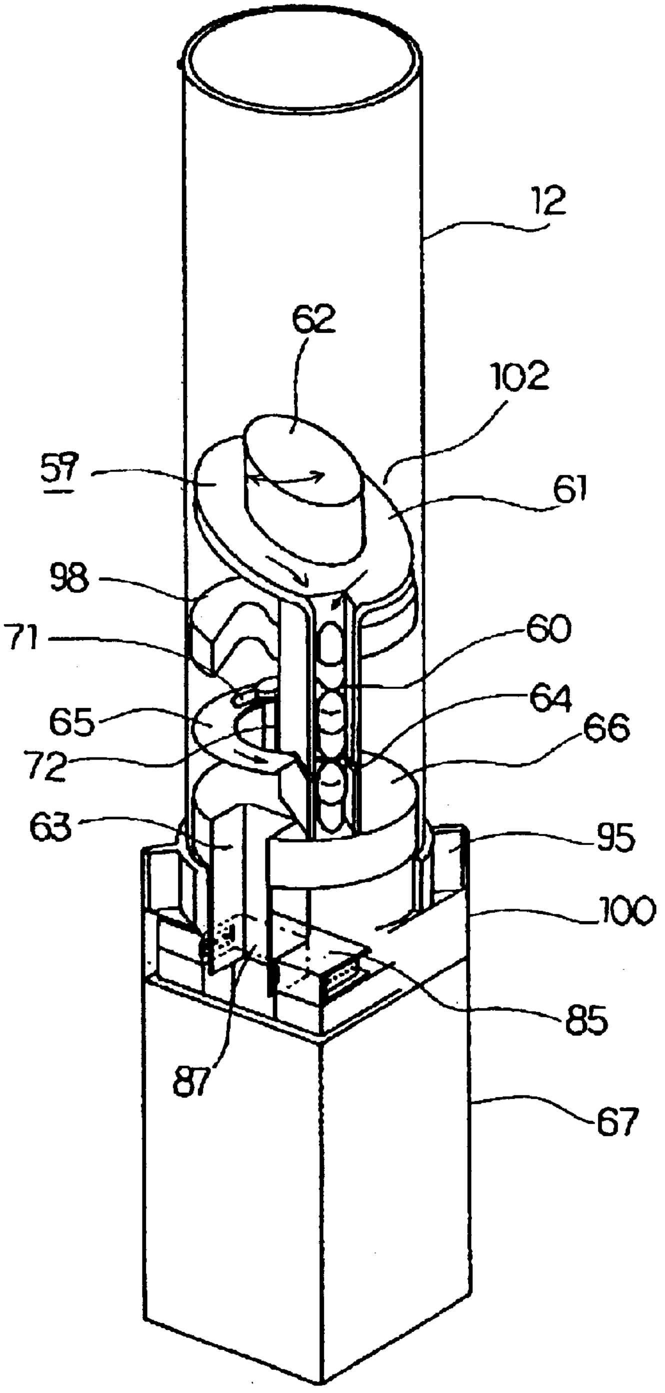
FIG. 2 is a perspective view of a medicine case at the released position of the partition of the alignment body.

The partition 65 attached on the fixing plate 66 is supported by a support 72 through a long hole 71 and, at the same time, biased to a direction shown by the arrow in FIG. 2 by a spring 73 at all times.

The shake mechanism 68 is comprised of an eccentric pin 74 linked to the DC motor 69 via the gear reducer, an shake plate 79 supported by the support 76 at one end for engaging the eccentric pin 74 in a long ditch 77 provided on the middle bottom face and at the same time having a shake pin 78 (vertically expandable) protruded on the top face of the other end, a sector-formed connecting piece 84 for engaging a kerf ditch 80 formed on one end with the shaking pin 78 and at the same time linking a support 81 protruded on the top face of other end to a driving shaft 99 of the alignment body 59.

85 is a detector mounted detachable to the top face of the support base 67 in connection with a tablet chute passage 86 provided on the side face of the support base 67, having a structure wherein a light emission element 88 and a light-receiving element 89 are opposed in a central concave 87 and a signal is generated by a tablet passing through the recess 87 and interrupting the light.

Figure 3:
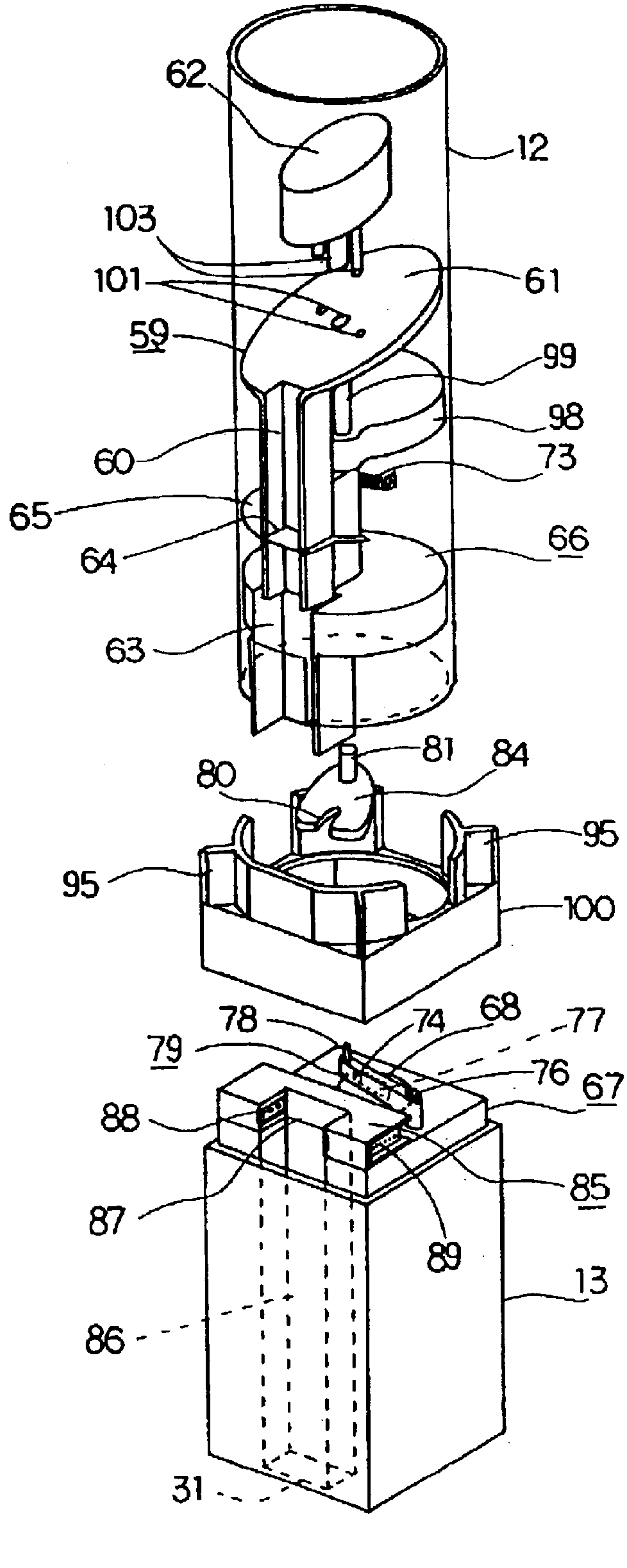
FIG. 3 is an exploded view of the medicine case.

The alignment body 59 constituting the mechanism unit 13 and the fixing plate 66 are mounted in the medicine case portion 12, presenting a structure wherein components above the connecting piece 84 and components below the shaking plate 79 in FIG. 3 are further separated by the linkage frame 100.

In thus composed medicine case 6, when a tablet pickup signal from the control unit 8 is dispensed, the DC motor 69 constituting the driving unit 70 rotates, and the rotation movement shall be converted into the shake movement by the eccentric pin 74 and the shaking plate 79. This shake movement is transmitted to the alignment body 59 through the connecting piece 84, and the alignment body 59 shakes horizontally between the position where the partition 65 interposes in the ditch 60 (position shown in FIG. 1) and the position where it does not interpose (position shown in FIG. 2) taking the driving shaft 99 of the alignment body as a fulcrum.

The tablet contained in the medicine case portion 12 enters in the ditch 60 by the guide face 61, but remains here because there is the partition 65 in the middle of the ditch 60 while the alignment body 59 is at the position of FIG. 1.

Thereafter, when the alignment body 59 shakes and comes to the position of FIG. 2, the partition 65 will be absent in the ditch 60, and the tablet in the lowest part stopped at the partition 65 falls on the fixing plate 66. Then, the alignment body 59 starts to shakes again towards the position of FIG. 1, one tablet fallen on the fixing plate 66 is returned to the ditch 60 under the partition 65 and discharged through a notch 63 and the chute passage 86.

There, the falling tablet passes through the concave 87 of the detector 85, a signal indicating that one tablet was discharged from the medicine case 6 is detected and the signal is sent to the control unit 8.

Here, the gear reducer in the support base 67 is set to reduce the revolution of the DC motor to the order of 1/100, the shaking plate 79 makes one round shake (movement from the position of FIG. 1 back to the position of FIG. 1 through the position of FIG. 2) by one revolution of the eccentric pin 74 and discharges one tablet. Time necessary for one round shake is 0.4 to 0.5 seconds, and tablets aligned in the ditch 60 and contained on the partition 65 fall instantaneously on the fixing plate 66, and are separated by the partition 65 and let fall down.

Besides, an alignment member 62 defining a tablet alignment ditch 102 between the peripheral face thereof and the medicine case 12 is mounted detachable on the guide face 61 of the alignment body 59. In short, the alignment member 62 is mounted by engaging a leg 103 protruding on the bottom face in a hole 101 of the guide face 61.

The basic composition of the tablet packing machine (medicine packing apparatus) of the present invention is as mentioned above, and in the one according the present invention, furthermore, a self-dischargeable cloth ("self-discharge cloth", hereinafter) is pasted to the medicine case. Several kinds of tests for confirming an appropriate discharge of medicine has been executed by changing the position and size of this self-discharge cloth, as described below.

First of all, the medicine discharge test (discharge test 1) has been performed for a non countermeasure medicine case for which no countermeasure has been taken (sample 1), a medicine case wherein a JIBS standard steel plate (SUBS) is applied to the inside of the case inside (sample 2) and a medicine case in which a self-discharge cloth is applied from the outside of the case (sample 3).

The self-dischargeable cloth is a woven fabric blends stainless short fibers (electro conductive fiber) in polyester filament yarn having a characteristic of provoking a weak corona discharge between fine lines and electro static charges, when the electro conductive fiber (line diameter around 10 $\mu$m) approaches a charged body (charged case or medicine), which obtains a static eliminating ability of static electricity, and eliminates static electricity of the charged object.

In this test, the number of failed discharge of the samples 1, 2, 3, namely the number of medicines not discharged by one swing of the alignment body 59 was measured. It should be noted that the number of swings was set to 3600.

If the number of failed discharges for the sample 1 is set to 100%, the number of failed discharge for the sample 2 was about 52%, and about 34% for the sample 3.

According to this result, it was found that the sample 2 and the sample 3 have, though insufficient, an effect of reducing the failed discharge.

The Inventor has estimated that it would be possible to reduce furthermore the number of failed discharges by devising the position or area of application of the self-discharge cloth, for the sample 3 which has presented the best results, and performed the following test.

It should be noted that an electro conductive two-sided tape was used to paste the self-dischargeable cloth of the sample 1. This is because it could be confirmed that the self-discharge does not occur in case of using a commercialized non-electro conductive two-sided tape, by measuring the electric potential. Consequently, an electro conductive two-sided tape is used for all of applications of the self-discharge cloth.

The sample 4 is the one wherein the medicine case is covered with a self-discharge cloth Ac for about one third round (about 120 degrees) of the upper part from the ditch (inflow passage).

The sample 5 is the one in which a portion opposed to the sliding area (area which shakes) of the alignment body 59 of the medicine case is covered with a self-discharge cloth Ad, about one third of a round (about 120 degrees). This portion is covered relatively largely to cover it securely, because the shake angle of the alignment body 59 is about 90 degrees.

For the sample 6, the height position for pasting the self-dischargeable cloth is same as the sample 5, but one round (full circle, 360 degrees) is covered.

In the sample 7, positions of the sample 4 and the sample 5 are covered with a single self-discharge cloth Ac, about one third round (about 120 degrees).

It should be noted that the height dimension L is substantially equal to the dimension of the ditch 60 and, substantially equal to the height dimension of the alignment body 59. Besides, the height dimension M is set to 50 mm and, at least the upper part of the ditch (inflow passage) 60 is set to 20 mm or more, or to a dimension relatively larger than the height dimension of at least five or more tablets of the medicine.

The number of failed discharge, namely the number of times where a single medicine was not discharged by one swing of the alignment body 59, was measured by using the samples 4, 5, 6, 7.

In short, a test 2 for controlling to discharge 1200 tablets in total by repeating a cycle of filling the case with 1250 tablets, discharging 100 tablets, taking an interval of 60 sec, discharging again 100 tablets, . . . Was executed.

The number of failed discharge in the test 2 was, respectively, 248 tablets for the sample 4, 272 tablets for the sample 5, 25 tablets for the specimen 6 and 0 tablet for the sample 7.

Consequently, it can be understood that the sample 7 is the best, and the number of failed discharge is substantially low for the sample 6.

Next, using the samples 4, 6, 7, a test 3 consisting in discharging continuously 1200 tablets, without the interval, was executed. Note that the sample 5 was eliminated from the test, because the result of the test 2 was the worst.

The number of failed discharged in this test 3 was respectively, 439 tablets for the sample 4, 25 tablets for the sample 6 and 0 tablet for the sample 7.

Consequently, it can be understood that the sample 7 had no failed discharge and the sample 7 is the best embodiment. It is supposed that this is because the sliding portion of the alignment body 59, and the portion where the mutual friction of tablets is maximum (upper part of the ditch 60) are covered with a self-discharge cloth to prevent this portion from being charged, and in case of static build-up, it was discharged.

Moreover, it is found that the sample 6 has quite small number failed discharge and can considerably reduce the number of the failed discharge, although it cannot be the as the best one. It is supposed that this is because the portion where tablets rub each other is covered with a self-discharge cloth, all around the cartridge, to prevent this portion from being charged, and if charged, it was discharged.

Though in the embodiment, the one in which the alignment body 59 shakes has been described, it may be applied to those wherein the discharge drum (alignment body) rotates, as the one described in Japanese Patent Laid-Open Publication No. 1997-95312. In this case, a large cloth is required, because it is necessary to paste a self-dischargeable cloth to the area corresponding to the revolution area of the discharge drum (full circle), at least 20 mm of the upper part of the inflow passage, or, the area of the full circle of the height corresponding to at least five medicines.

As mentioned hereinabove, according to the invention of claim 1 , as the portion of shake of the alignment body is prevented from being charged, and if charged, it can be discharged, medicines can be prevented from being stuck to and not discharged.

Moreover, according to the invention of claim 2, the portion-the portion at least 20 mm in the upper part of the inflow passage, or in the height of at least five tablets of medicine-where medicines rub each other to be easily charged is prevented from being charged, and even if charged, it can be discharged. As a result, medicines can be prevented from being stuck to and not discharged.

In addition, according to the invention of claim 3, both the portion where the alignment body shakes and the portion where medicines rub each other to the maximum are prevented from being charged, and even if charged, they can be discharged. Therefore, medicines can be prevented from being stuck to and not discharged.

Further, according to the invention of claim 4, as a self-dischargeable cloth is pasted by an electro conductive two-sided tape, antistatic function or electric discharge function are not inhibited, it is prevented from being charged, and if charged, they can be discharged, and therefore, medicines can be prevented from being agglomerated and not discharged.

Moreover, according to the invention of claim 5, the medicine case of any one of claims 1 to 4 being provided, medicines can be prevented from being not discharged and time for packing medicine can be shortened.

What is claimed is:

1. A medicine case, comprising a medicine case portion for containing a medicine on the upper part thereof and a mechanism unit on the lower part thereof, the mechanism unit having an inflow passage where medicine in said medicine case portion flows through and a guide face for guiding the medicine into the inflow passage, further having an alignment body rotated or shaken by a driving unit and a fixing plate having a medicine chute passage for the medicine communicating with said inflow passage and a partition interposed in the way of the inflow passage, wherein a self-dischargeable cloth having an area opposed at least to the slide area of the alignment body is arranged, outside of the medicine case.

2. A medicine case, comprising a medicine case portion for containing a medicine on the upper part thereof and a mechanism unit on the lower part thereof, the mechanism unit having an inflow passage where the medicine in said medicine case portion flows through and a guide face for guiding the medicine into the inflow passage, further having an alignment body rotated or shaken by a driving unit and a fixing plate having a medicine chute passage communicating with said inflow passage and a partition interposed in the way of said inflow passage, wherein a self-dischargeable cloth having a breadth of at least 20 mm in the upper part of said inflow passage, or a breadth of at least five times the dimension of said tablets measured along said inflow passage is arranged all around the outside of the medicine case.

3. A medicine case, comprising a medicine case portion for containing a medicine on the upper part thereof and a mechanism unit in the lower part thereof, the mechanism unit having an inflow passage where the medicine in said medicine case portion flows through and a guide face for guiding the medicine into the inflow passage, further having an alignment body rotated or shaken by a driving unit and a fixing plate having a medicine chute passage communicating with said inflow passage and a partition interposed in the way of said inflow passage, wherein a self-dischargeable cloth having an area opposed at least to the slide area of said alignment body and having a breadth of at least 20 mm in the upper part of said inflow passage, or, a breadth of at least five times the dimension of said tablets measured along said inflow passage is arranged, outside of the medicine case.

4. The medicine case of claims 1 to 3, wherein said self-dischargeable cloth is pasted to said medicine case from the outside with an electroconductive two-sided tape.

5. A medicine packing apparatus, comprising the medicine case of any of claims 1 to 4.

* * * * *

UNITED STATES PATENT AND TRADEMARK OFFICE

CERTIFICATE OF CORRECTION

PATENT NO. : 6,948,635 B2

APPLICATION NO. : 10/455565

DATED : September 27, 2005

INVENTOR(S) : Koichi Kobayashi

It is certified that error appears in the above-identified patent and that said Letters Patent is hereby corrected as shown below:

Column 1, line 24, “convener” should read --conveyer--;

Column 2, line 55, “Ad, Ea, Ac” should read --A2, A3, A4--;

Column 3, line 37, “detachable” should read --detachably--;

Column 4, line 66, “detachable” should read --detachably--;

Column 5, line 15, “JIBS” should read --JIS--;

Column 5, line 15, “(SUBS)” should read --(SUS)--;

Column 5, line 52, “Ac” should read --A1--;

Column 5, line 58, “Ad” should read --A2--;

Column 5, line 66, “Ac” should read --A4--;

Column 8, claim 4, line 29, “of claims 1 to 3” should read --of claim 1--; and

Column 8, claim 5, line 33, “any of claims 1 to 4” should read --of claim 1--.

Signed and Sealed this

Fifteenth Day of April, 2008

JON W. DUDAS

*Director of the United States Patent and Trademark Office*